US011153379B2

(12) United States Patent
Boston et al.

(10) Patent No.: US 11,153,379 B2
(45) Date of Patent: \*Oct. 19, 2021

(54) METADATA SYNCHRONIZATION SYSTEM

(71) Applicant: Bank of America Corporation, Charlotte, NC (US)

(72) Inventors: Michelle A. Boston, Richardson, TX (US); Ilya Lapsker, Kew Gardens, NY (US)

(73) Assignee: Bank of America Corporation, Charlotte, NC (US)

( * ) Notice: Subject to any disclaimer, the term of this patent is extended or adjusted under 35 U.S.C. 154(b) by 219 days.

This patent is subject to a terminal disclaimer.

(21) Appl. No.: 16/585,329

(22) Filed: Sep. 27, 2019

(65) Prior Publication Data

US 2020/0028906 A1 Jan. 23, 2020

Related U.S. Application Data

(63) Continuation of application No. 15/056,452, filed on Feb. 29, 2016, now Pat. No. 10,432,716.

(51) Int. Cl.
*G06F 16/27* (2019.01)
*G06F 16/2457* (2019.01)
*H04L 29/08* (2006.01)
*G06Q 10/10* (2012.01)

(52) U.S. Cl.
CPC .... *H04L 67/1095* (2013.01); *G06F 16/24573* (2019.01); *G06F 16/275* (2019.01); *G06Q 10/10* (2013.01)

(58) Field of Classification Search
CPC ........ G06F 16/27; G06F 9/445; G06F 16/275; G06F 16/78
See application file for complete search history.

(56) References Cited

U.S. PATENT DOCUMENTS

| | | |
|---|---|---|
| 7,469,248 B2 | 12/2008 | Agrawal et al. |
| 7,523,118 B2 | 4/2009 | Friedlander et al. |
| 7,853,624 B2 | 12/2010 | Friedlander et al. |
| 8,250,583 B2 | 8/2012 | Grasselt et al. |
| 8,412,746 B2 | 4/2013 | Fox et al. |
| 8,538,985 B2 | 9/2013 | Betawadkar-Norwood et al. |

(Continued)

FOREIGN PATENT DOCUMENTS

KR 10-1078617 10/2010

*Primary Examiner* — Yuk Ting Choi
(74) *Attorney, Agent, or Firm* — Weiss & Arons LLP; Michael A. Springs, Esq.

(57) ABSTRACT

A metadata synchronization system is provided. The metadata synchronization system may include a plurality of metadata elements included in a plurality of applications. The plurality of applications may be coupled to a plurality of application hubs. The plurality of application hubs may be coupled to a federated metadata repository. The plurality of application hubs may be coupled to a governed metadata repository. The system may include crawling the plurality of applications, the plurality of application hubs, the federated metadata repository and the governed metadata repository to ensure that the metadata elements are synchronized across all of the components. In the event that a metadata element is not synchronized across any one of the components, the system may notify interested parties and/or resolve the discrepancy.

6 Claims, 16 Drawing Sheets

(56) References Cited

U.S. PATENT DOCUMENTS

| | | | |
|---|---|---|---|
| 2009/0024561 A1 | 1/2009 | Palanisamy | |
| 2009/0234850 A1* | 9/2009 | Kocsis | G06F 16/213 |
| | | | 707/999.006 |
| 2011/0239055 A1 | 9/2011 | Busayarat et al. | |
| 2012/0084341 A1* | 4/2012 | Mantri | G06F 16/2329 |
| | | | 709/203 |
| 2012/0151278 A1* | 6/2012 | Tsantilis | G06F 11/366 |
| | | | 714/48 |
| 2012/0310982 A1* | 12/2012 | Jennery | G06F 16/278 |
| | | | 707/781 |
| 2014/0150060 A1 | 5/2014 | Riley | |

* cited by examiner

Business Attributes' Values Changes Governance Workflow UI — 600

Case INFORMATION
| | | | | |
|---|---|---|---|---|
| Case Creation Date: | MM/DD/YYYY (not editable) | Case Worker: | not editable | |
| Originating Metadata Repsository | options are CUSTOMER | Case ID | not editable | Re-Assign — 602 |

1. Separate screen opens and allows to select anyone in the team to reassign to (overall list of team members maintain seperately)

DATA ELEMENT
| AIT | Server | Database/Location | Schema | Table/File | Field/Columns |
|---|---|---|---|---|---|
| numerical: 10 characters; not editable | X | Y | Z | A | B |

SME Meeting Information — 604
| SME | Meeting Date |
|---|---|
| SME Name drop-down | Date picker |

606 — Attachments  
608 — 10 MB max

1. SME drop-down will display list of SMEs for given Originating Metadata Repository (SME Names/Originating Metadata Repository list managed seperately)
2. Only one SME name can be selected
3. Attachments are at the case level, not the attribute level

CURRENT CASE

| | What Changed? | | Metadata Change | | | |
|---|---|---|---|---|---|---|
| Attribute Name | MetaPortal Attribute Value | Metadata Repository Attribute Value | Metaportal Change? | Decision Comments | Target Date — 610 |
| Business Name | Account status code | something different than column C | No (Yes/No drop-down) | Text; 4000 characters | Text; 4000 characters | Date picker |
| Address City | x | y | Yes (Yes/No drop-down) | Text; 4000 characters | Text; 4000 characters | Date picker |
| Address State | x | y | Yes (Yes/No drop-down) | Text; 4000 characters | Text; 4000 characters | Date picker |
| Address Zip Code | x | y | Yes (Yes/No drop-down) | Text; 4000 characters | Text; 4000 characters | Date picker |

1. Target Resolution Date (if Metaportal change=yes, then target date=blank and not editable
2. If Metaportal change=no, then default target date=today( )+ 5 business days and is editable through date picker

FIG. 6A

LAST MATCHING CASE *THIS TABLE IS COLLAPSIBLE

What Changed?

| Case Number | Case Close Date | Attribue Name | MetaPortal Attribue Value | Metadata Repository Attribute Value | SME | SME Meeting Date | Metaport of Change? | Decision Comments | Attach-ments | Target Date |
|---|---|---|---|---|---|---|---|---|---|---|
| 12345 | | Business Name | Account status code | Account Status | | | No | | | 12/31/2015 |
| 12345 | | Address City | X | X | | | No | | | 12/31/2015 |
| 12346 | | Address State | X | X | | | No | | | 12/31/2015 |
| 12347 | | Address Zip Code | X | X | | | No | | | 12/31/2015 |

← 612 →  ← 614 (Metadata Change Decision) →

1. Only contains rows where Originating Metadata Repository + 5-part key + Attribute matched
2. Only display matches from last matched Case Save | Submit 1. The save button allows user to save information at any time until case is complete (Submit button clicked)
2. The Submit button will only be enabled once all required fields are filled in

FIG. 6B

Metadata Repositories' Landing Zone/DMR Staging tables

Green: Main delta and full load tables    Blue: Dimension tables used for constraints
Yellow: Data Controls table    Cyan: Domain mapping table (CST_ = customer)

METADATA SYNCHRONIZATION SYSTEM

CROSS-REFERENCE TO RELATED APPLICATION

This application is a continuation of U.S. patent application Ser. No. 15/056,452 filed on Feb. 29, 2016, now U.S. Pat. No. 10,432,316, and entitled "METADATA SYNCHRONIZATION SYSTEM" which is hereby incorporated by reference herein in its entirety.

FIELD OF THE INVENTION

This invention relates to metadata. Specifically, this invention relates to metadata synchronization across a variety of computer components.

BACKGROUND OF THE INVENTION

Many applications in a computer system include metadata. For the purposes of this application, metadata may be understood to be data characterizing data. It may be desirable for the metadata elements to be continually synchronized across a variety of applications.

SUMMARY OF THE DISCLOSURE

Discovery of metadata information or metadata discrepancies may be provided. A Becubic™ system may perform scans for discrepancies. Application hubs may perform application modeling.

A method for metadata synchronization is provided. The method may include receiving, from a plurality of applications, a plurality of metadata elements at a federated metadata repository. The plurality of applications may be coupled to a plurality of application hubs. The transmission of the metadata may be through the application hubs.

The method may include receiving a subset of the plurality of metadata elements at a governed metadata repository. The subset of metadata elements may be entity-critical metadata elements.

The method may include crawling the plurality of applications to determine that each metadata element has been received at the federated metadata repository. A crawler may perform the crawling.

Upon crawling the plurality of applications, the crawler may identify a metadata element that has not been received at the federated metadata repository. The method may also include transmitting a first notification message to a first user upon identification of the independent metadata element. The first user may be an application owner associated with the identified metadata element. Upon receipt of the first notification message, the first user may couple the independent metadata element to the federated metadata repository.

In some embodiments, a computer, or algorithm may take the place of the first user. The computer or algorithm may receive the notification of the message. Upon receipt of the notification message, the computer or algorithm may couple the independent metadata element to the federated metadata repository.

The method may also include crawling the federated metadata repository and the governed metadata repository to determine whether each metadata element that is included in both of the metadata repositories are identified using the same data type. The crawling may be performed by a crawler.

For the purposes of this application, data type may be a characterized as follows. Specifically, data type may refer to an account number of type string in one system and an account number of a different type in another system. Another example may be an account number with a description that states "Account Number" in one system and states "This account number represents . . . " in another system.

Upon identification of a metadata element which is identified using one data type in the federated metadata repository and another data type in the governed metadata repository, the method may also include conforming the data types of the identified metadata elements.

The method may also include transmitting a second notification message to a second user upon completion of the conforming.

In some embodiments, the second notification message may be transmitted upon identification of the metadata element that is identified using one data type in the federated metadata repository and another data type in the governed metadata repository. In these embodiments, a distinct computer and/or algorithm may perform the conforming, as described above.

The method may include crawling the federated metadata repository and the governed metadata repository to determine which metadata elements should be assigned to the governed repository, i.e., assigned a governed status.

In some embodiments, metadata elements with a governed status may incorporate more fields than federated metadata elements.

In certain embodiments, one can search or filter metadata elements by category. This may be understood to mean that a metadata element stay belong to a group or specific category. An example of a category may be an Account Number.

In some embodiments, matching information may be presented on the screen. The system may enable a user to choose metadata elements, add additional metadata elements and move data elements to the governed metadata repository.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIGS. 6A and 6B show an illustrative user interface of an embodiment, of the invention;

DETAILED DESCRIPTION OF THIS DISCLOSURE

Figure 1A:
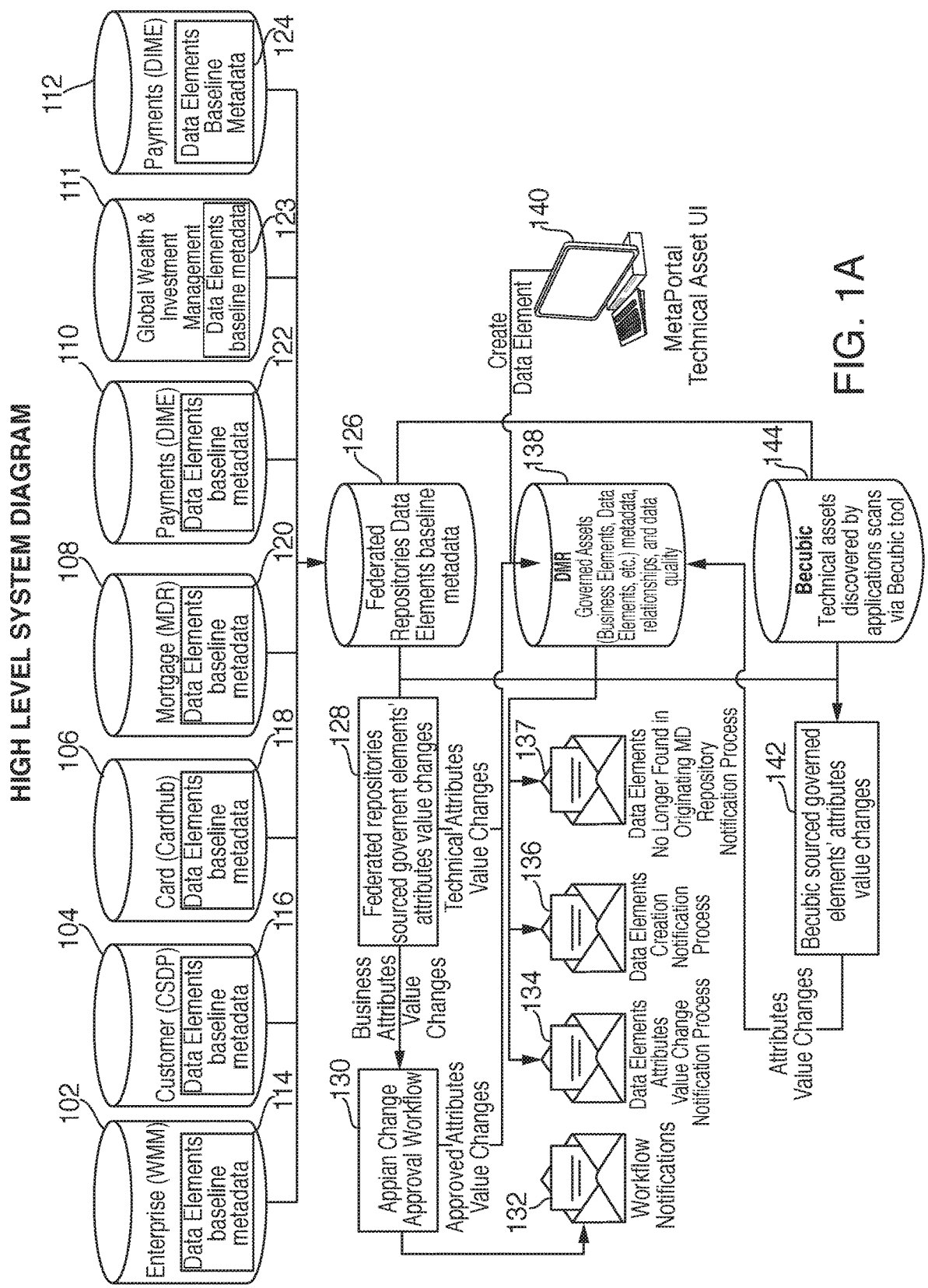
FIG. 1A shows an illustrative flow chart of an embodiment of the invention.

A system for synchronizing metadata across a plurality of applications is provided. The system may include a plurality of applications. Each application may include a plurality of metadata elements. Each application may be coupled to an application hub included in a plurality of application hubs. The plurality of application hubs may include one or more of an enterprise hub, a customer hub, a payment card hub, a mortgage hub, a payments hub, a global wealth and investment management hub and a deposits hub.

The system may also include the plurality of applications hubs. Each application hub may include data elements baseline metadata. The data elements baseline metadata may control the plurality of metadata elements associated with each application to which it is coupled. Each of the data elements baseline metadata may be coupled to a glossary. The glossary may include a universal set of metadata elements that can be utilized across substantially all the application hubs.

In some embodiments, each hub may be associated with its own glossary. The glossary may enable a user to import data catalog information. A metadata element may be stored without a description, but a description, associated with the metadata element, may be included in the glossary. The system may enable a user to retrieve the description from the glossary. The system may also enable a user to enter business related metadata into the glossary. Entering business related metadata into the glossary may be useful in a situation where it is difficult to enter the metadata information elsewhere.

The system may also include a federated metadata repository. The federated metadata repository may be configured to receive the plurality of metadata elements from the application hubs. The federated metadata repository may be coupled to each application hub. The coupling may be via a landing zone and/or a loading process.

The system may also include a governed metadata repository. The governed metadata repository may be coupled to the federated metadata repository. The governed metadata repository may be configured to receive a subset of metadata elements from the federated metadata repository.

The governed metadata elements—i.e., the metadata elements included in the governed metadata repository—may be entity-critical metadata elements. The governed metadata elements may include greater detail than the federated metadata elements—i.e., the metadata elements included in the federated metadata repository.

The system may also include a crawler. The crawler may be configured to crawl applications to ensure that each metadata element is copied into the federated metadata repository. The crawler may also be configured to crawl applications to ensure that each metadata element is up to date with a current set of metadata requirements.

The metadata requirements may be a set of requirements with which the metadata elements may be required to conform. For example, metadata requirements may require metadata data type rules and amount of characters per metadata element rules.

When a crawler identifies a metadata element in an application that does not conform with the current set of metadata requirements, the crawler may be configured to transmit a notification message to an owner of the application. The message may include the metadata element and current metadata element requirements. The application owner may execute appropriate changes to the application's metadata upon receipt of the notification message. The execution of the appropriate changes may be included in the re-loading of the metadata elements to the metadata repositories. The execution of the appropriate changes may occur at any other suitable time.

As described above, the system may enable modeling in a glossary—i.e., if a description is not associated with a metadata element, it may be retrieved from the glossary.

The crawler may also be configured to crawl the plurality of applications to identify a new metadata element in an application that is not coupled to the federated metadata repository. In response to identification of a new metadata element that is not coupled to the federated metadata repository, the crawler may be configured to transmit a notification message to persons associated with the owner of the application. The message may include the new metadata element. The message may also include current metadata element requirements.

The system may also include a technical discrepancy processor. The technical discrepancy processor, may be coupled to the federated metadata repository and the governs metadata repository. The technical discrepancy processor may be configured to determine technical discrepancies between metadata elements stored in the federated metadata repository and metadata elements stored in the governed metadata repository. Technical discrepancies may be metadata character size discrepancies, metadata data type discrepancies or any other suitable technical discrepancy.

The system may also include a technical notification processor. The technical notification processor may be coupled to the technical discrepancy processor. The technical notification processor may be configured to transmit a technical notification message to an execution team. The technical notification message may include the determined technical discrepancies.

The system may also include a business discrepancy processor. The business discrepancy processor may be coupled to the federated metadata repository and the governed metadata repository. The business discrepancy processor may be configured to determine business discrepancies between metadata elements stored in the federated metadata repository and the governed metadata repository. One example of a business discrepancy may be a metadata element that is labeled a governed element in one repository and is labeled a federated element in another repository. Another example of a business discrepancy may be a metadata element that includes one description in one repository and includes another description in another repository.

The system may also include a business notification processor. The business notification processor may be coupled to the business discrepancy processor. The business notification processor may be configured to transmit a business notification message to the execution team. The business notification message may include the determined business discrepancies.

The business notification processor may be coupled to Appian™ workflow. Appian™ workflow may enable an execution team to act upon the changes—e.g., review the changes, decide on the changes and execute the changes. Appian™ workflow is described in more detail below.

Illustrative embodiments of apparatus and methods in accordance with the principles of the invention will now be described with reference to the accompanying drawings, which form a part hereof. It is to be understood that other embodiments may be utilized and structural, functional and procedural, modifications may be made without departing from the scope and spirit of the present invention.

The metadata synchronization system may include a plurality of applications, a plurality of application hubs, a plurality of databases, a plurality of notification points and a plurality of data repositories. Each application may be coupled to an application hub. Each application may have associated metadata. Metadata may be data about data, e.g., an application name, an application type description, etc.

There may be shared metadata elements between applications, e.g., each application in the plurality of applications may have some of the same metadata elements as another application in the plurality of applications. Each shared metadata element should be of the same type (e.g., string, character, variant character, etc.). While each shared metadata element may have a different title in different systems, for example, one system may identify a metadata element as data type string and another system may identify the metadata element as data type number, because the components are the same, the elements may match regardless of their respective titles. Homogenizing the metadata among the applications may enable the system to uniformly manipulate the metadata and assess the metadata in a homogeneous manner. Keys may be utilized to manipulate the metadata and assess the metadata in a homogeneous manner. An example of a key may be a 5-part key. The 5-part key may check five attributes from one metadata element against the same five attributes in another metadata element to determine if the metadata elements match. Other examples of keys may include 4-part keys, 6-part keys, 7-part keys or any other suitable keys.

In order to assess and manipulate the metadata, each of the hubs may be coupled to a glossary and/or federated metadata repository. The federated metadata repository may contain all of the uniform metadata elements. The federated metadata repository may contain brief descriptions regarding each metadata element. The metadata elements contained in the federated metadata repository may be significant but not crucial to the underlying entity.

A glossary may be used to import technical data from an application—e.g., a data catalog. A glossary may also be used to select or enter business-like attributes—e.g., a description—into a metadata element.

A subset of federated metadata elements may be business-critical. For the purposes of this application, such business-critical metadata elements may be labeled governed elements. Governed metadata elements may be so labeled because they require greater scrutiny. In some embodiments, a separate repository may hold the governed elements. The repository may be known as the governed repository, or DMR (data management repository). In some embodiments, the governed elements, included in the DMR, may include more detail than the federated elements.

The metadata element, requirements (which ensure homogeneity of the same metadata elements) may change periodically, randomly or continuously. Some of the changes may be technical changes. For example, a metadata element which was previously stored on one server may currently be stored on a second server. A key may usually be coupled to a physical location rather than a data type, because a data type may be one of the metadata attributes.

Some of the changes may be business changes. An example of a business change may be a change in a description attribute of a metadata element. An exemplary description attribute may describe what an account number is. Another example of a business element may be a change in a classification attribute of a metadata element. A classification attribute may include classification information regarding the metadata element. Examples of a classification attribute may include an amount, an account or any other suitable classification information.

The system, utilizing a crawler, may ensure that each metadata element is coupled, to the system. The crawler may also ensure that each metadata element is up-to-date with the current metadata requirements. The crawler may inspect each application to make certain that new metadata elements are connected to the system. The crawler also may also ensure that each metadata element type is up-to-date with the current metadata element type.

Previously, the process of collecting operational metadata required for governance was difficult because it was often difficult to determine data ownership. Also, there was no common metadata glossary, common language or domain of values. For the purposes of this application, a domain of values may be a generic label used for substantially similar attributes, e.g., a security classification defined as confidential, proprietary or public. Because there was no common metadata glossary, common language or domain of values, not all the required data elements were included in the system. At times, there were mistyped key and metadata information.

In addition, there was no process for keeping governed metadata in sync with the originating metadata repositories. Data elements which were deleted in a metadata repository still existed in the governed metadata repositories.

Therefore, a metadata synchronization system is provided. The system may establish a baseline metadata for physical data elements in data provisioning hubs. The hubs may connect systems, or applications in each domain.

The system may also display substantially all the data elements and their baseline metadata on a single page in a metaportal web portal. The display may show the data elements baseline metadata from all the hubs. The same metaportal page may display the data elements and their baseline metadata. The data elements and their baseline metadata may be discovered via application scans performed by Becubic™. The system may also show which data elements match against the governed data elements stored in DMR. The system may also allow data to be sorted, filtered and exported to an Excel™ spreadsheet or any other suitable document format.

The system may create governed data elements based on elements discovered by the hubs or by the Becubic™ data elements. The system may enable selection of a hub or Becubic™ data elements and create governed data elements in DMR. The system may pre-populate, based on the originating source, data element creation screens, with keys and baseline metadata. The system may also allow entry of missing information. The system may enable governed data elements to have an originating metadata repository attribute where the source will be stored (either a hub or Becubic™).

The system may determine changes between governed database elements baseline metadata attribute values in DMR and the originating repository. The governed data element technical attribute values may be automatically updated when a change or updated occurs in the original repository. Changes relating to business descriptions may be assigned a new case information view Appian™ workflow and address Data management teams. Data capture may be established for all governed data element attribute value changes including date/time, person who made the change and/or workflow case number.

The system may also include notification of new governed data elements and of data element attribute value changes.

The following FIGS. 1A-9B illustratively show, in detail, the metadata architecture system described above. Additional detail regarding the metadata architecture system has been described in Appendix A.

FIG. 1A shows an illustrative high level system diagram of certain embodiments. Enterprise hub 102 may control substantially all enterprise applications. In certain embodiments, enterprise hub 102 may also be coupled with substantially all enterprise applications. Enterprise hub 102 may include data elements baseline metadata 114. Data elements baseline metadata 114 may include a list of metadata elements. Some examples of metadata elements may include location, name and address. The list of metadata elements may be the same list of metadata elements for each application controlled by enterprise hub 102. The metadata elements may be synchronized between substantially all applications connected to enterprise hub 102.

In certain embodiments, customer hub 104 may control substantially all customer applications. In certain embodiments, customer hub 104 may be coupled with substantially all customer applications. Customer hub 104 may include data elements baseline metadata 116. Data elements baseline metadata 116 may include a list of metadata elements. Some examples of metadata elements may include location, name, telephone number and address. The list of metadata elements may be the same list of metadata elements for each application controlled by customer hub 104. The metadata elements may be synchronized between substantially all applications connected to customer hub 104.

In certain embodiments, card hub 106 may control substantially all card applications. In some embodiments, card hub 106 may be coupled with substantially all card applications. Card hub 106 may include data elements baseline metadata 118. Data elements baseline metadata 118 may include a list of metadata elements. Some examples of metadata elements may be card owner, card number, expiration date and security code. The list of metadata elements may be the same list of metadata elements for each application controlled by card hub 106. The metadata elements may be synchronized between substantially all applications connected to card hub 106.

In some embodiments, mortgage hub 108 may control substantially all mortgage applications. In certain embodiments, mortgage hub 108 may be coupled with substantially all mortgage applications. Mortgage hub 108 may include data elements baseline metadata 120. Data elements baseline 120 may include a list of metadata elements. Some examples of metadata elements may be borrower name, loan amount, property address and property value. The list of metadata elements may be the same list of metadata elements for each application controlled by mortgage hub 108. The metadata elements may be synchronized between substantially all applications connected to mortgage hub 108.

In some embodiments, payments hub 110 may control substantially all payment applications. In certain embodiments, payments hub 110 may be coupled with substantially all payment applications. Payments hub 110 may include data elements baseline metadata 122. Data elements baseline metadata 122 may include a list of metadata elements. Some examples of metadata elements may be payment amount, payer name, payer address and payer telephone number. The list of metadata elements may be the same list of metadata elements for each application controlled by payments hub 110. The metadata elements may be synchronized between substantially all applications connected to payments hub 110.

In some embodiments, global wealth and investment management hub 111 may control substantially all wealth and investment applications. Global wealth and investment management hub may deliver comprehensive wealth management financial solutions to individual and institutional clients worldwide. In certain embodiments, global wealth and investment management hub may be coupled with substantially all wealth and investment applications. Global wealth and investment management hub 111 may include data elements baseline metadata 123. Data elements baseline metadata 123 may include a list of metadata elements. Some examples of metadata elements may be investment return rates and investment risk percentages.

In some embodiments, deposits hub 112 may control substantially all deposit applications. In certain embodiments, deposits hub 112 may be coupled with substantially all deposit applications. Deposits hub 112 may include data elements baseline metadata 124. Data elements baseline metadata 124 may include a list of metadata elements. Some examples of metadata elements may be depositor name, deposit amount and deposit date. The list of metadata elements may be the same list of metadata elements for each application controlled by deposits hub 112. The metadata elements may be synchronized between substantially all applications connected to deposits hub 112.

Substantially all of the metadata stored in enterprise hub 102, customer hub 104, card hub 106, mortgage hub 108, payments hub 110, global wealth and investment management hub 111 and deposits hub 112 may be transmitted to federated repositories data elements baseline metadata 126. The federated repositories data elements baseline metadata 126 may include core attributes regarding each metadata element. For example, each metadata element may include information regarding where the data is located, information regarding how the data is used and any other suitable information.

A selective set of metadata may also be included in DMR 138. DMR 138 may include a subset of critical and important metadata elements. For example, governed assets, business elements, data elements, critical metadata elements, relationships and data quality. The metadata included in DMR 138 may also be included in federated repositories data elements baseline metadata 126. DMR 138 may enable extensive data control on each metadata element included in DMR 138. DMR 138 may also enable greater attribute control for each metadata element included in DMR 138. The governed elements included in DMR 138 may require more attention and/or precision than operational level metadata.

Metadata element changes may occur in an application, in a repository, in a data store or any other suitable location. Changes may occur because of application updates, repository conversions, data store modifications or any other suitable causes. Federated repositories sourced governed elements attributes value changes 128 may check the differences between DMR 138 and federated repositories data elements baseline metadata 326. Value changes 128 may look at both DMR 138 and federated repositories data elements baseline metadata 126 to determine if there were any technical updates to the metadata. An exemplary technical update may be a change in a data type of an attribute to an element, e.g., data element x may have been of type "string" and was changed to type "character".

Appian™ change approval workflow 130 may check both DMR 138 and federated repositories data elements baseline metadata 126 to determine if there were any business updates to the metadata. An exemplary business update may be a change in the importance of a metadata element, e.g., a previously business critical metadata element may have become less significant.

Based on both technical updates and/or business updates, DMR 138 may be updated appropriately. Interested parties may be notified of workflow notifications, as shown at 132. Interested parties may also be notified of new data elements, as shown at 136, data elements creation notification process. Interested parties may also be notified of technical updates, as shown at 134, data element attribute value change notification process.

When a data element is no longer found in originating metadata repository, interested parties may be notified via notification 137.

Becubic™ datastore 144 may perform application scans. The application scans may check applications and their metadata. The scans may determine if an application is not connected to a hub. The scans may also determine if an application is only partially connected to a hub. Becubic™ datastore 144 may include up-to-date metadata field information. Becubic™ datastore may include the required metadata fields for each application. Therefore, Becubic™ datastore 144 may determine whether an application is current with the metadata fields.

In the event that Becubic™ datastore 144 determines a technical difference in a metadata element for each application, Becubic™ datastore 144 may transmit the inconsistency to Becubic™ sourced governed elements' attributes value changes 142.

At metadata portal technical asset UI (user interface) 140 the system may enable an execution team to view the federated metadata elements and the governed metadata elements. UI 140 may also enable the execution team to view the overlap in the metadata elements between the federated metadata elements and the governed metadata elements. UI 140 may also enable the execution team to view the overlap in the metadata elements between Becubic™ metadata elements and the governed metadata elements.

Figure 1B:
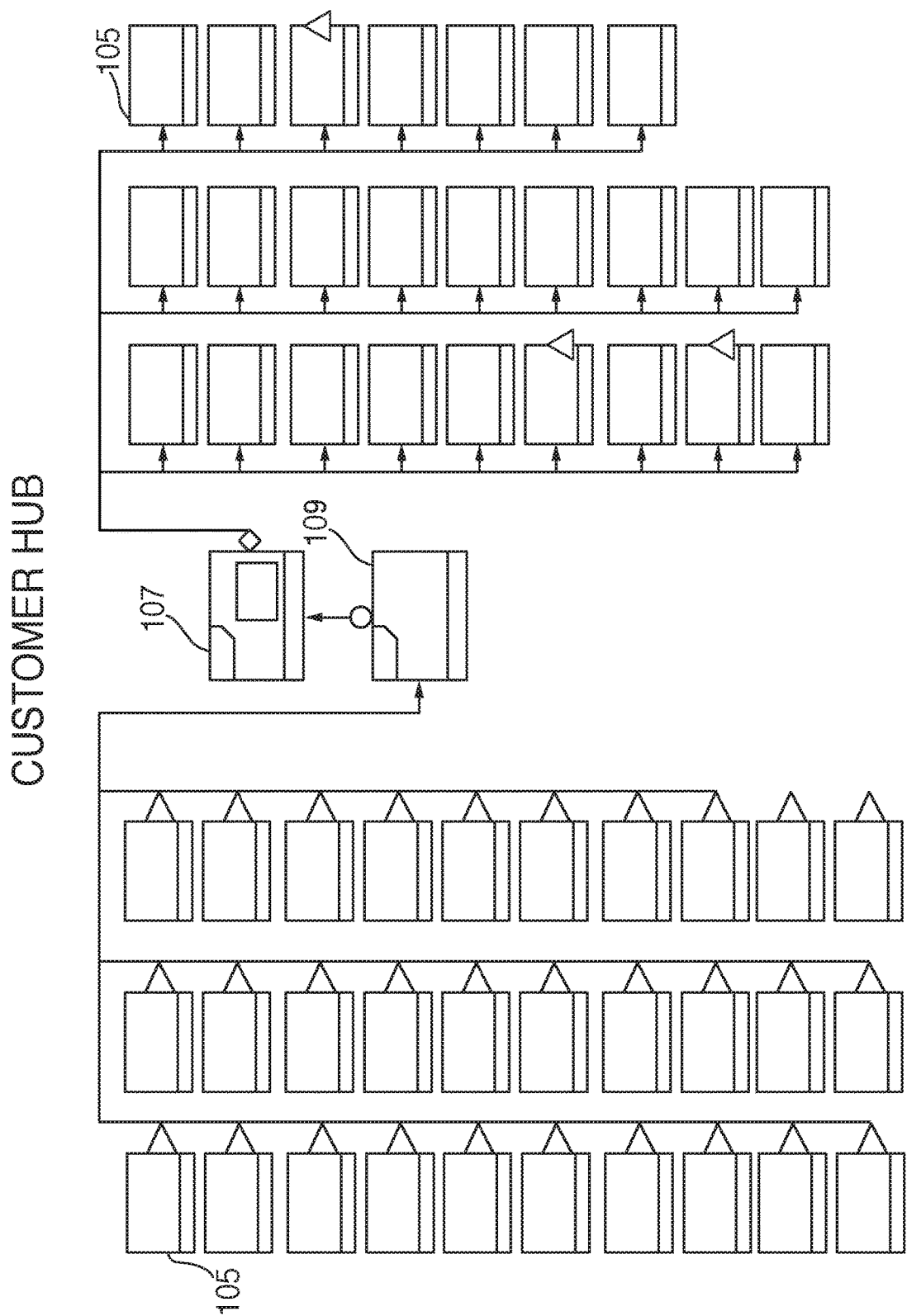
FIG. 1B shows an illustrative hub of an embodiment of the invention.

FIG. 1B shows an exemplary hub. The hub shown in FIG. 1B may be a customer hub. The customer hub may have a central application hub 107 connected to many applications, for example, applications 105. Central application hub 107 may receive and transmit information to the various applications to which it is connected and/or coupled.

The customer hub may also include application 109. Application 109 may connect or be coupled to applications on the left side of the diagram. Application 109 may also retrieve data and/or information from the applications on the left side of the diagram. Application 109 may be coupled and/or coupled to central application hub 107.

Figure 2A:
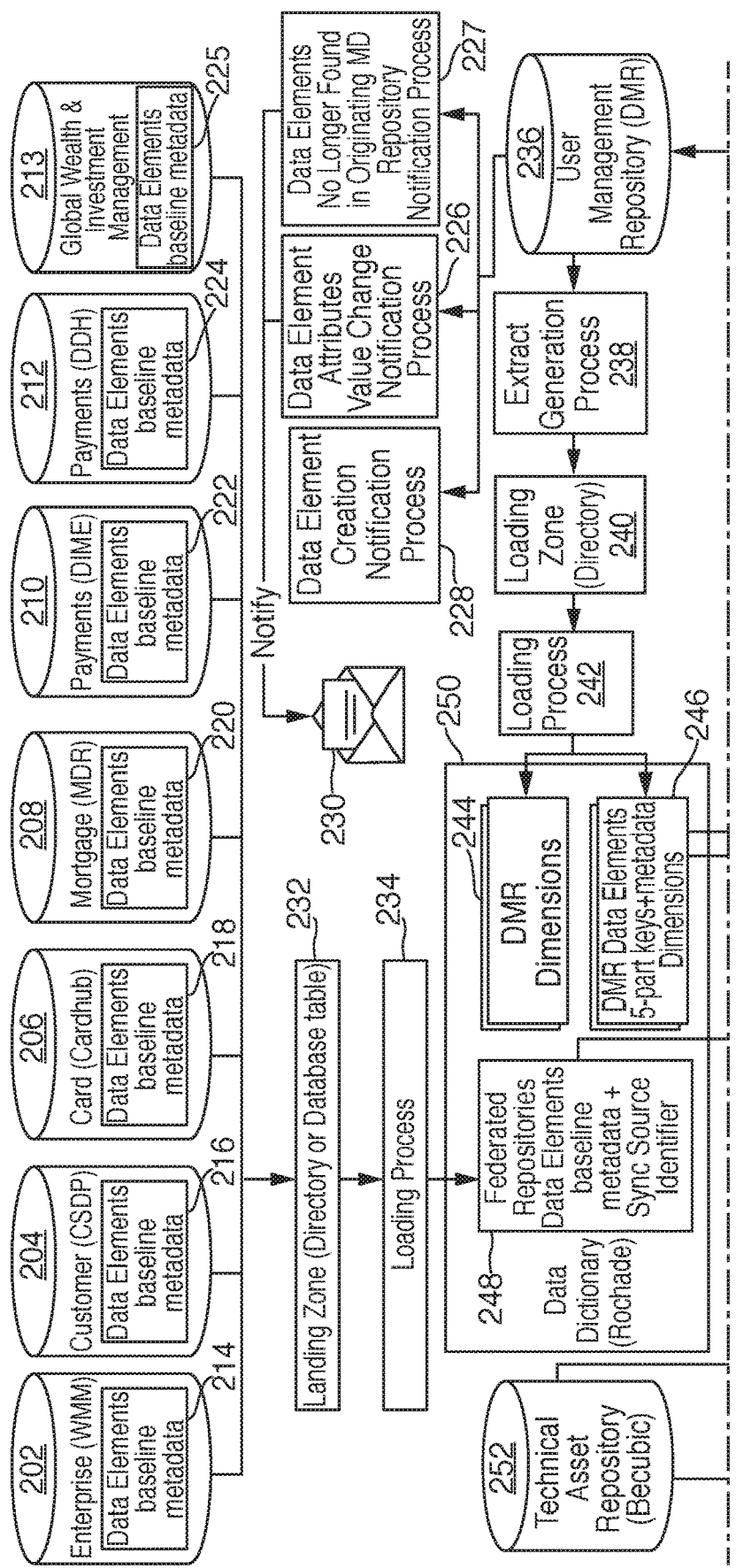
FIGS. 2A and 2B show an illustrative flow chart of an embodiment of the invention.
Figure 2B:
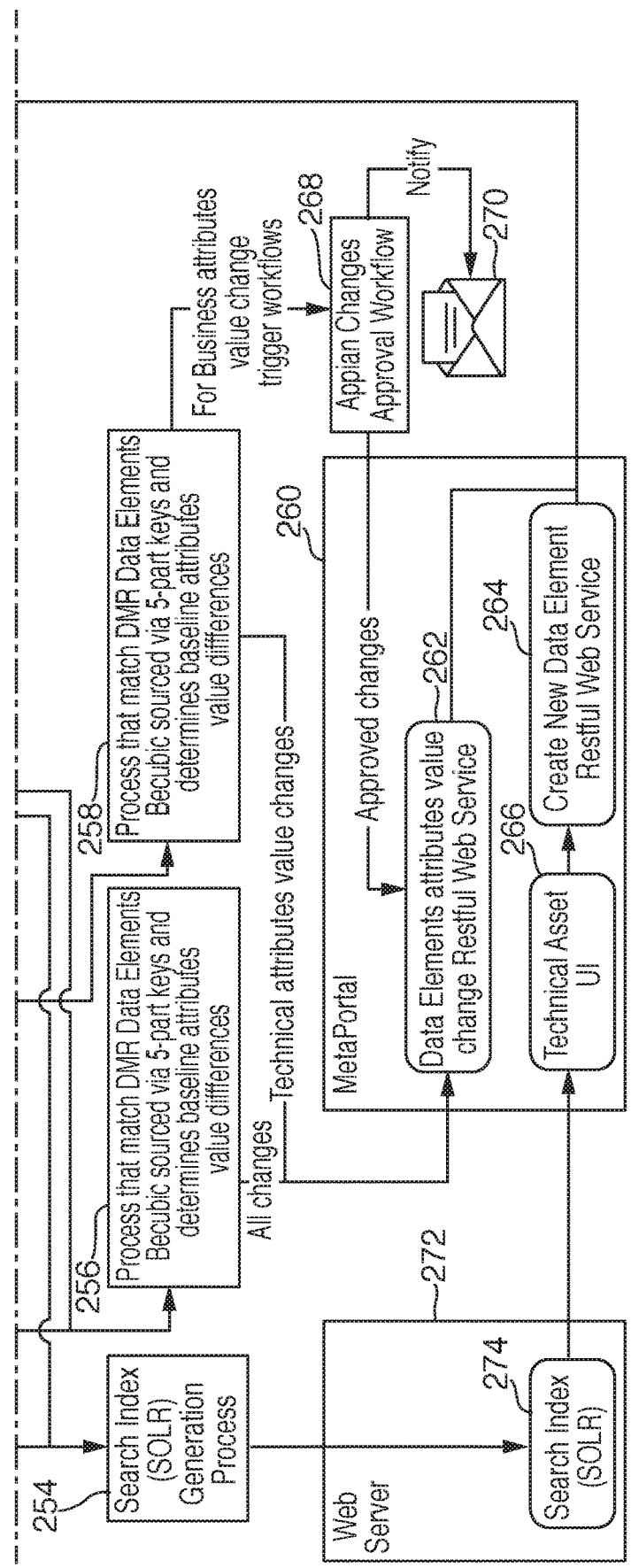

FIG. 2 shows art illustrative detailed system diagram. Hubs 202-212 and data elements baseline metadata 214-224 have been described above in connection with FIG. 1, where the hubs and data elements baseline metadata have been labeled hubs 102-112 and data elements baseline metadata 114-124.

Hubs 202-212 may transmit the metadata to landing zone 232. The transmitted metadata may be a delta transmission, e.g., the difference in the metadata between the current transmission and the last transmission. The system may also retrieve all of the metadata once in a specific time period, e.g., the system may retrieve all the metadata monthly. The full retrieval may serve as a safety mechanism for information that may have gotten lost in the delta transmission. The landing zone 232 may transmit the metadata to loading process 234. Loading process 234 may transmit the metadata to data dictionary (Rochade™) 250. During loading process 234, data validation may be performed to ensure accuracy of the data.

Data dictionary (Rochade™) 250 may include federated repositories data elements baseline metadata plus sync source identifier 248. Federated repositories data elements baseline metadata plus sync source identifier 248 may include core attributes regarding each metadata element. For example, each metadata element may include information regarding where the data is located, information regarding how the data is used, etc.

Data dictionary (Rochade™) 250 may also include DMR dimensions 244. Data dictionary (Rochade™) 250 may also include DMR data elements 5-part keys plus metadata 246.

The metadata may be transmitted from data dictionary 250 to processes 256. Processes 258 may determine differences in the metadata, as described above in connection with FIG. 1. Processes 258 may transmit the business attributes changes to Appian™ changes approval workflow 268.

At Appian™ changes approval workflow 268, an execution team may be assigned to the changes. The execution team may meet to discuss the changes. The execution team may come to a decision regarding the metadata changes. The execution team may instruct an application owner to implement the changes. Any interested party may be notified of the changes via notification point 270. In the event that the execution team does not come to a decision regarding the changes, the meeting may be documented and the decision may be put on hold for decisioning at a later time. The documentation may include general tracking and documentation information relating to the responsible team member, e.g., next meeting information, time of meeting, person and decision.

Processes 258 may transmit technical changes to data elements value change restful web service 262, which may be included in metaportal 260. Appian™ changes 268 may transmit approved business changes to data element value change restful web service 264. Also included in metaportal 260 may be technical asset UI (user interface) 266 and create new data element restful web service 264. In some embodiments, a landing zone or a global view may be utilized instead of restful services.

Technical asset repository 252 may store metadata that has been discovered from Becubic™ application scans. Technical asset repository 252 may utilize search index process 254, which may enable the user to search both the federated assets and the governed assets. Search index process 254 may be an independent process. Search index process 254 may utilize Becubic™ information retrieved from technical asset repository 252, federated repository information 248 and governed repository information 246, to create SOLR index. SOLR may be an open source enterprise search platform written in Java™ by Apache™. A search engine or framework SOLR setup on a web server that may use the search index may enable quick and easy searching, filtering and displaying of both the federated and governed assets. Search index process 254 may also utilize search index 274, which may be included in web service 272. The storage iteration—i.e., the transfer of data from Becubic™ 252 to metaportal 260—may be a separate process from the transfer of data from DMR and federated repositories to metaportal 260. The search engine/framework may build SOLR index 274 based on the data transfer.

Technical asset, repository 252 may also transmit data to process 256. Process 256 may perform a match, using a 5-part key or any other suitable key, between DMR data elements and Becubic™. The matching may be based on grouping of metadata elements. Metadata elements may be grouped by column number or any other suitable method. Process 256 may also determine baseline attribute value differences.

Create new data element restful web service 264 may transmit new data element information to DMR 236. DMR 236 may transmit metadata changes to data element change notification process 225. DMR 236 may also transmit new metadata elements to data element creation notification process 228. DMR 236 may also transmit attribute value changes to data element attributes value change notification process 226. DMR 227 may also transmit data elements that have been removed from their originating metadata repository to data elements no longer found in originating metadata repository notification process 227. Notification point 230 may notify interested parties of changes and new metadata elements.

In some embodiments, selection of a data element on a technical asset user interface may mark the data element governed. Once the data element is marked governed, a user may add additional, attributes and select a save button to trigger a restful service. In these embodiments, the restful service may be called in response to selection of the save button.

DMR 236 may transmit changed and new metadata element information to extract generation process 238. Extract generation process 238 may transmit changed and new metadata element information to landing zone (directory) 240. Landing zone (directory) 240 may transmit new and changed metadata element information to loading process 242. Loading process 242 may transmit metadata element information to DMR dimensions 244 and DMR data elements 5-part keys plus metadata 246, which are both included in data dictionary (Rochade™) 250. The 5-part keys may be utilized for matching data elements, as described above.

Figure 3:
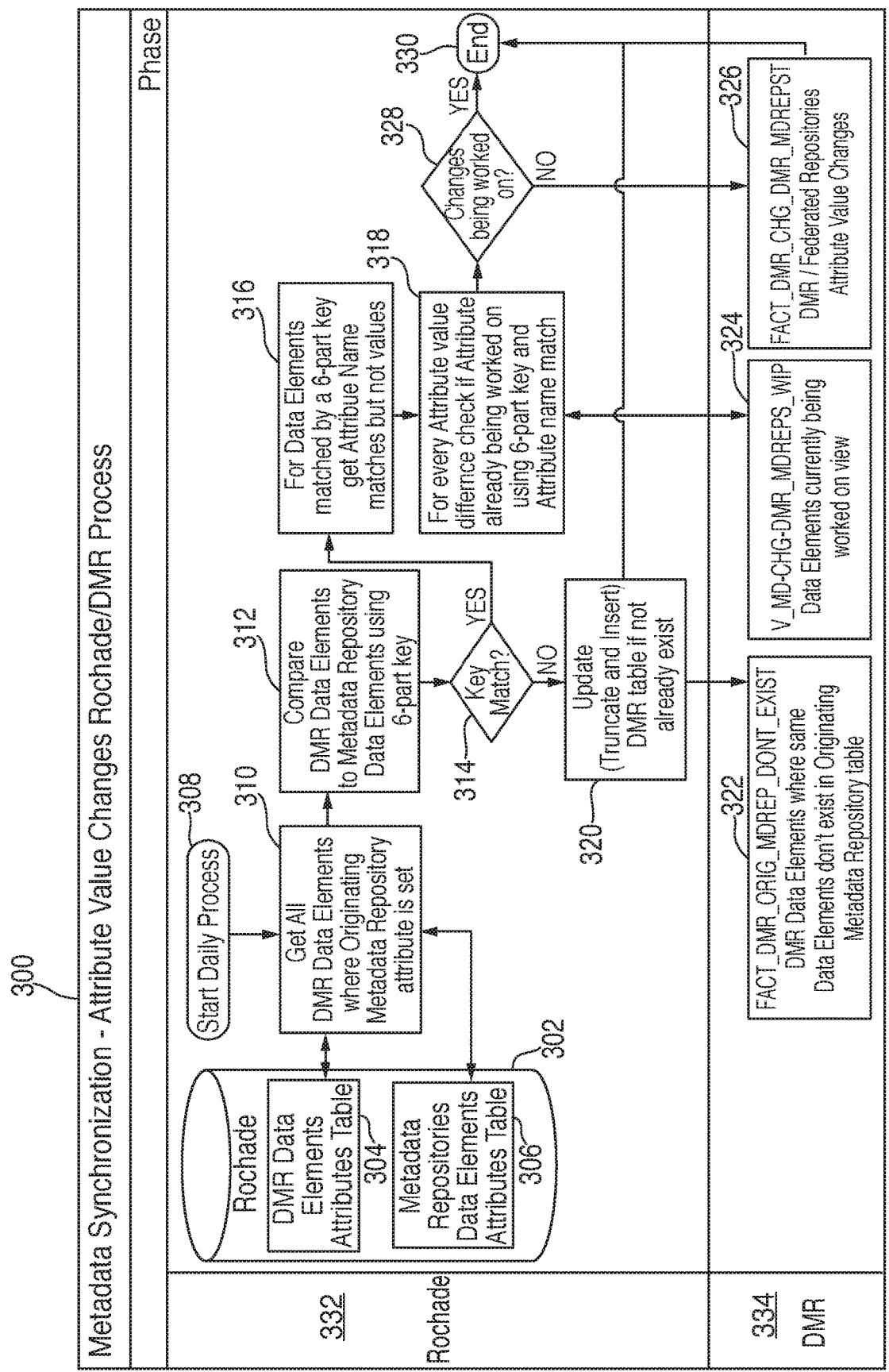
FIG. 3 shows an illustrative flow chart of an embodiment of the invention.

FIG. 3 shows an illustrative attribute value change process between federated repository (Rochade™) and DMR. Flow chart 300 includes swim lane 332—Rochade™. Steps included in swim lane 332 may occur in a federated repository. Flow chart 300 may also include swim lane 334—DMR. Steps included in swim lane 334 may occur in a DMR repository.

A daily process may start at 308. Step 310 may show retrieving DMR data elements, in which the originating metadata repository attribute is set, from other sources. The process may include retrieving DMR data element attributes table 304. The process may also include retrieving metadata repository data elements attribute table.

In certain embodiments, the originating metadata repository attribute may determine which repository data was synched from (e.g., customer, card, etc.). Governed elements, from DMR, may be selected and compared to metadata elements pulled into the federated repository from some equivalent repository.

Step 312 shows comparing a set of DMR data elements to a set of metadata repository data elements. In a perfect reconciliation, the data elements included in the DMR data element repository and the data elements included in the metadata repository should match—i.e., the elements included in both metadata repositories should be the same.

A key may be used to check if the data elements from one metadata repository match the data elements from the other metadata repository. In some embodiments, a 6-part key may be used. The 6-part key may compare six attributes from each metadata element, in one metadata repository to six attributes of each metadata element in the other metadata repository. The system may perform a match, when a six attribute combination for one data element matches a six attribute combination for the same data element in a different metadata repository.

In certain embodiments, a determination may be performed as to whether the data source still exists. For example, when an account number element is transferred from a customer hub into DMR (governed system), one can delete the account number from the customer hub and/or the related application.

When the system performs a metadata element match—i.e., a metadata element found in one metadata repository was matched in another metadata repository—as queried at 314, the process may proceed to step 316. When the system does not perform a metadata element match, the process may proceed to step 320. While each shared metadata element may have a different title in different systems, for example, one system may identify a metadata element as data type string and another system may identify the metadata element as data type number, if the components are the same—i.e., the data included in both metadata elements are substantially equivalent—the elements may match regardless of their respective titles.

Step 316 shows a scenario wherein the data elements are matched by the 6-part key, but the values included in the attributes do not match. Step 318 shows checking, using a 6-part key and attribute name match, for each difference between attribute values, if the attribute is already in the process of being evaluated. This may avoid the execution teams reviewing duplicate changes.

Query 328 shows, if the changes are being worked on, completing the process, as shown at 330. Query 328 shows, when the changes not being worked on, transmitting to and storing the changes in DMR/Federated repository attribute value changes, as shown at 326. In certain embodiments, values stored, as shown at 326, may be used by Appian™ workflow to be evaluated. Values stored, as shown at 326, may also be used by DMR to apply changes.

Step 324 shows when changes are in the process of being modified, the system may save those changes to a data elements in the process of being modified table.

In a scenario where the 6-part key does not produce a match, the system may show updating the DMR table, as shown at 320. Updating may include truncating the data and inserting the data into the DMR table. Step 322 may show storing the unmatched data elements in an originating metadata repository table. In certain embodiments, an unmatched data element may be a data element which may be found in one repository and not found in another repository.

Figure 4:
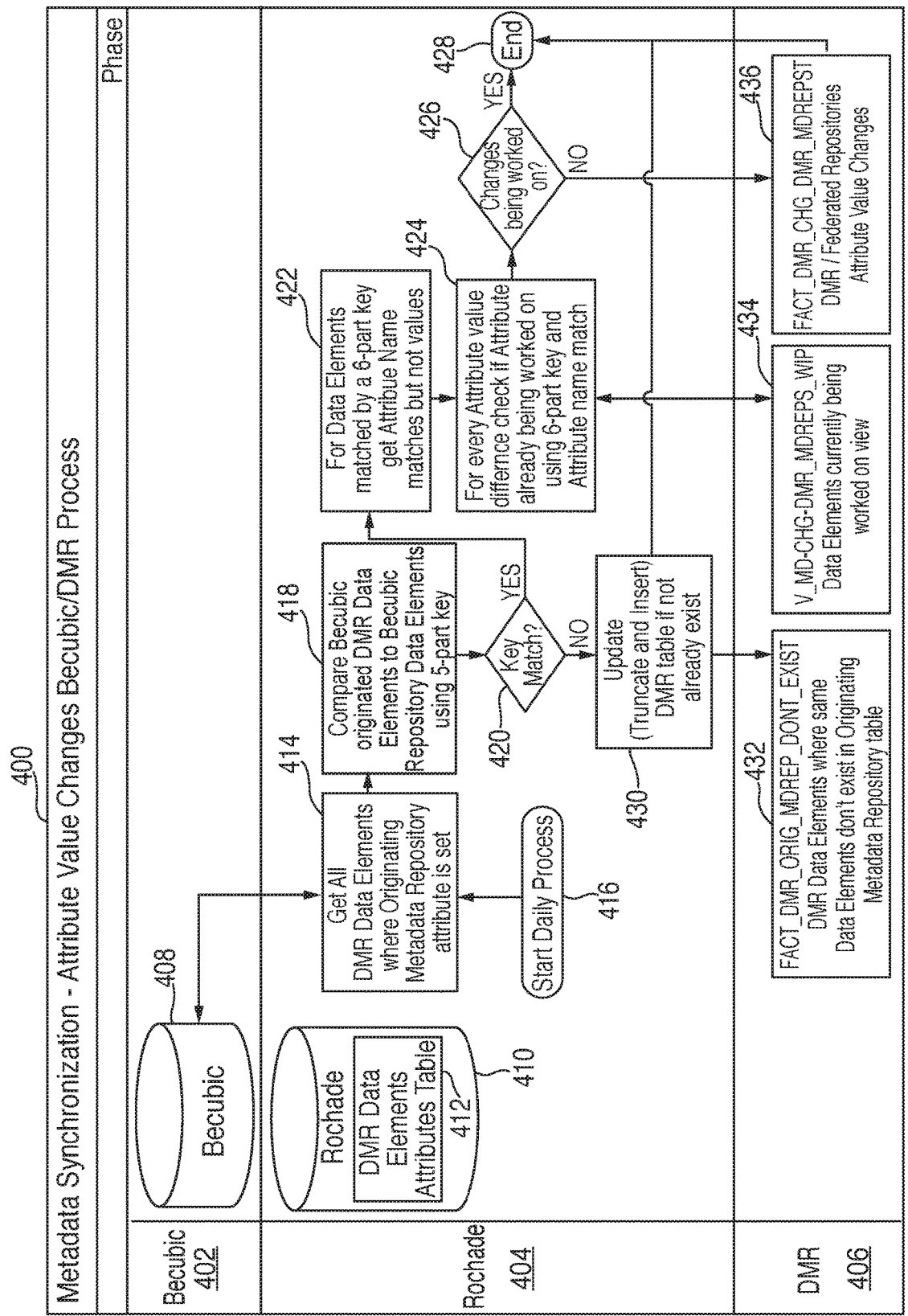
FIG. 4 shows an illustrative flow chart, of an embodiment of the invention.

FIG. 4 shows an illustrative change process between Becubic™ metadata repository and DMR. Flow chart 400 includes swim lanes 402—Becubic™, 404—Rochade™ and 406—DMR. Steps included in swim lane 402 may occur in a Becubic™ repository. Steps included in swim lane 404 may occur in a Rochade™ repository. Steps included in swim lane 406 may occur in a DMR repository.

Step 416 shows a start of a daily process. Initially, the process may retrieve DMR data element attribute table 412 from Rochade™ 410, as shown at 414. The process may only retrieve data elements where the metadata repository attribute is Becubic™—i.e., data elements that should also be included in Becubic™ repository 408. The process may also retrieve data elements from Becubic™ repository 408.

Step 418 shows comparing the data elements retrieved from Becubic™ 408 to the data elements included in table 412. A 5-part key may be utilized to perform the comparing. Data elements where the originating repository may be equivalent to Becubic™ may be selected from DMR data elements in table 412.

For each data element compared, if the 5-part key matches, the process goes through query 420 and proceeds to step 422. For each data element compared, if the 5-part key does not match, the process goes through query 420 and proceeds to step 430.

In certain embodiments, a determination may be performed as to whether the metadata source still exists. The determination may be performed by checking against Becubic™ Repository (408). Becubic™ repository may be updated when Becubic™ is used to scan or rescan applications. For example, when an account number metadata element is transferred from Becubic™ repository 408 into DMR, the account number metadata element may be deleted from the application originally scanned by Becubic™ and then removed from Becubic™ repository 408 based on the rescan.

Step 420 shows a scenario where the attribute names of the data elements from both Becubic™ and table 412 match, but the attribute values do not match. Step 424 shows for each attribute value difference, checking, utilizing a 6-part key and an attribute name match, if the value difference is being worked on. If the changes are being worked on, the process completes at 428, as shown at 428. If the changes are not being worked on, the process proceeds to step 436. Step 436 may show storing the attribute value differences in a DMR/Federated repositories attribute value changes table. In certain embodiments, the values stored in 426 may be used by Appian™ workflow to assign an execution to team to the changes and execute the changes. The values stored in 426 may also be used by DMR to apply the changes.

Step 434 shows a view in which a user can view the data elements currently being modified. The view described at 434 may enable a user to determine the attribute differences, as described in connection with step 424.

In some embodiments, step 434 may include receiving information regarding data elements currently being modified. The system may save the data elements currently being modified in a data elements currently being modified table. This may ensure that more than one execution team is not working on the same data element that requires change.

In a scenario where the key does not match, as queried at 420, the process may proceed to step 430. Step 430 includes updating table 412. Updating may include truncating and inserting data elements into table 412. The data elements being updated may be transmitted to, and stored in, a DMR data elements where same data elements do not exist in originating metadata repository table, as shown at 432. Step 432 may also include viewing the unmatched data elements in a DMR data elements where the same data elements do not exist in originating metadata repository table.

Figure 5A:
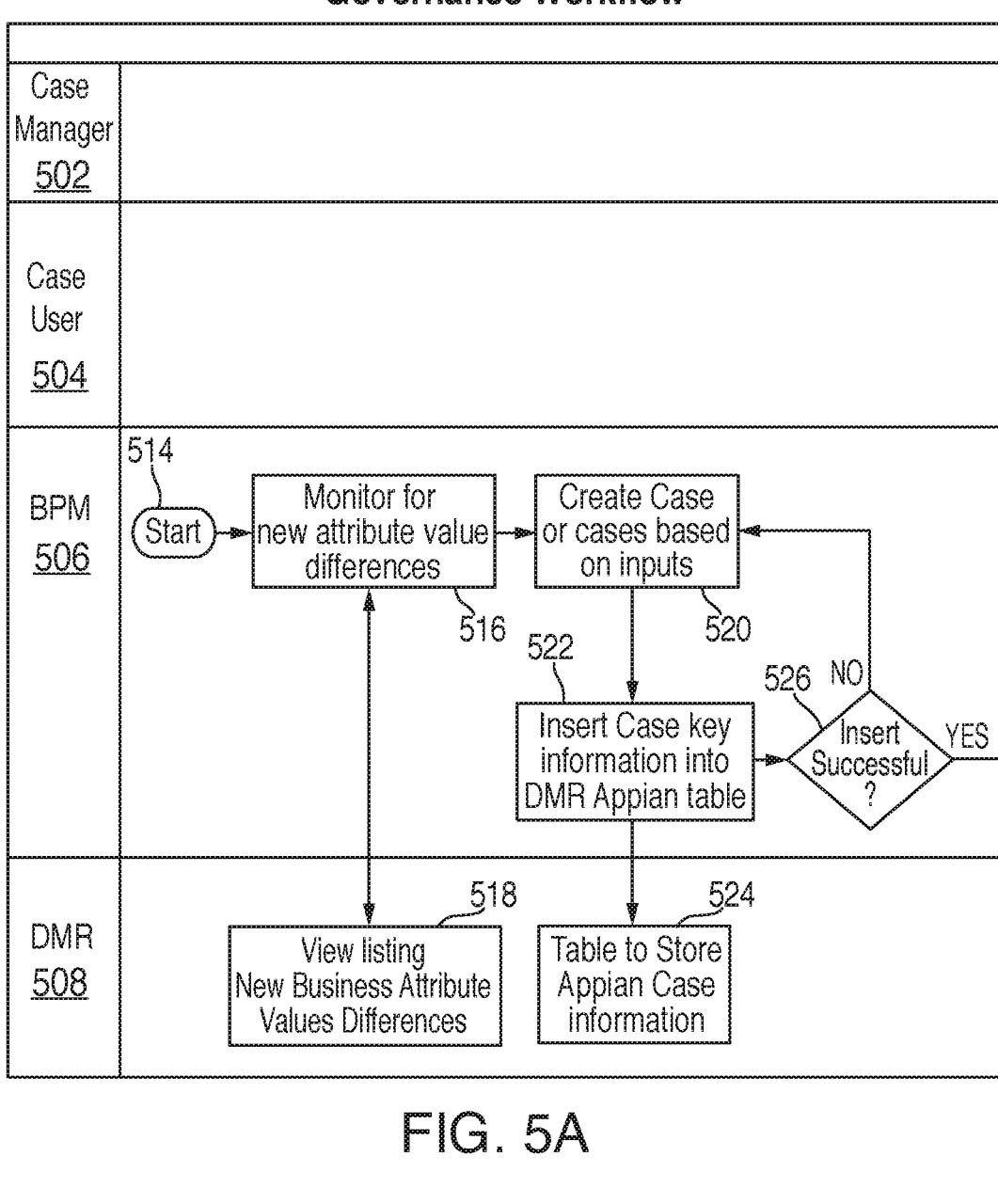
FIGS. 5A and 5B show an illustrative flow chart of an embodiment of the invention.
Figure 5B:
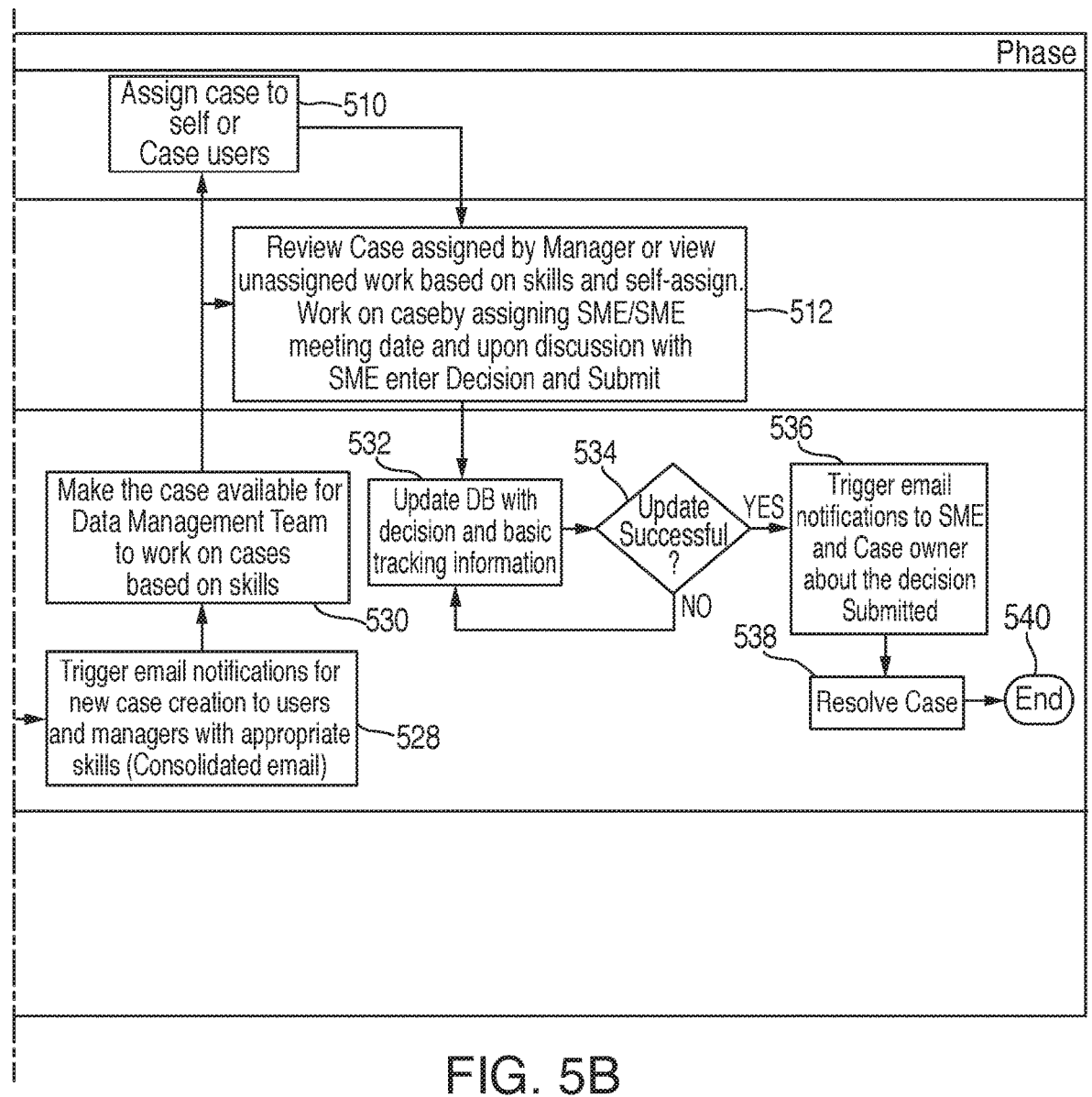

FIG. 5 shows a business attributes' values changes governance workflow. Flow chart 500 includes swim lane 502—case manager, swim lane 504—case user, swim lane 506—business process management ("BPM") and swim lane 508—DMR.

The process may begin in the BPM, as shown at 514. BPM may refer to an engine or software such as Appian™. Step 516 shows monitoring for new attribute value differences. Step 516 may be in communication, preferably at least once a day or at some other suitable time period, with step 518. Step 518 shows viewing a listing of new business attribute value differences. Step 516 may transmit the new attribute value differences to the listing of business attribute value differences at DMR, as shown at 518. 518 may be an actual database view that may include the differences, while 516 may check for the changes to act upon.

Step 520 shows creating one case or a plurality of cases based on inputted or retrieved business attribute value differences. Step 522 shows inserting a case key associated with the case or plurality of cases into a DMR Appian™ table. BPM may transmit the Appian™ case information to a table in DMR, as shown at 524. For the purposes of this application, a case may be understood to refer to a metadata element that requires modification. A case may also be understood to mean a unit of work that has attributes grouped together logically, using a key, and enables the unit of work to be processed. The term "being processed" may include assigning work, document work, document decisions and/or any other suitable processing information.

When the insert is successful, the process may proceed to step 528, as shown at 526. When the insert is unsuccessful, the process proceeds back to step 520, which shows creating a case or a plurality of cases based on inputs. When the insert is unsuccessful, the process may create a retry instance. The retry instance may manage potential technical issues that may arise when writing into an external table.

Step 528 shows triggering an email notification. The email notification may inform users and managers of a new case creation. Step 530 shows making the case available to a data management team. The data management team may modify and adjust the cases according to its skill and tools at its disposal. Upon assigning a data management team, the process may proceed to step 510 or step 512.

Step 510 shows that, a case manager, within a data management team, may assign the case to himself or to a case user. Step 512 shows a case user reviewing the case assigned by a manager. The case user may assign the case to himself if he has the appropriate skills. The case user may modify the case by assigning a meeting date. Upon discussion of the case at the meeting, the case user may enter the decision and submit the case.

Upon entering the decision and submitting the case, the process may proceed to step 532. Step 532 shows the BPM may update a database with the decision and basic tracking information.

When the update is unsuccessful, the process may proceed back to step 532. When the update is unsuccessful, the process may create a retry instance. The retry instance may deal with potential technical issues that may arise when writing into an external table. When the update is successful, the process may proceed to step 536. Step 536 shows triggering transmission of email notifications. Step 532 shows saving the decisions. The saved decisions may be used to either update DMR at a later point in time or document what will be done by the application owner in the original system of origin. The email notifications may be transmitted to a data management group. The email notifications may also be transmitted to the case owner. The case owner, together with the data management group may determine a decision about how to proceed with a metadata element. The decision may be submitted upon transmission of the email notifications. Upon transmission of the submission, the case may be resolved, as shown at 538. The process may terminate at 540.

In certain embodiments, notification may occur after the decision is entered. The notification may foe transmitted to a case worker and subject matter expert ("SME") that a decision has been made and the contents of the decision.

FIG. 6 shows a business attributes' value changes governance workflow user interface ("UI"). A business person may utilize UI 600 for each case in order to resolve the case. Entry box 602 may include case information such as case creation date, originating metadata repository, case worker and case ID. Some fields may be editable while other fields may be not editable.

Entry box 604 may include fields relating to the data element such as, application inventory tool ("AIT"), server, database location, schema, table/file and field/columns. An AIT may be a system in which applications are registered and related information, such as an owner or contact, are stored. In some embodiments, AIT may refer to an application. The fields may be a method of grouping attributes logically. Entry box 606 may include meeting information. The meeting information may include a data management group. The meeting information may also include a meeting date. A case user that is assigned to a case may be part of a data management team. A meeting date may be scheduled with the case user and a SMS. The meeting may enable the case user to retrieve information and make a decision regarding the case.

A business person may attach a relevant file, as it relates to the current case, e.g., an email exchange with an SME, using entry box 608. The left portion—"Current case what changed section"—of the box may include information relating to the differences between DMR and origination metadata repository. The right portion—"metadata change section"—of the box may relate to the decision to be made based on the change(s).

Included in the "Current case what changed" portion may be attributes where values in DMR and originating metadata repository differ. The attributes displayed, and the value differences associated therewith may be determined by the change process discussed in FIG. 4.

The "metadata change section" may include a metaportal change field yes/no selection. In this embodiment, metaportal may be synonymous with DMR. Metaportal may be a term used for business users as opposed to developers. A user may select yes if a DMR or metaportal attribute value requires changing to a metadata repository attribute value. A user may select no if a DMR attribute value does not require change. The "metadata change section" portion may also include a decision comments entry field. The decision comments entry field may enable a user to enter comments regarding the decision.

The "metadata change section" portion may also include a target date picker. The target date picker may preferably be enabled only if there is no DMR change. The target date picker may enable a user to set a deadline when the attribute value change should occur. The decisions comments and the target date picker may be used to document decisions regarding changes that will be made by application owners in a source system as opposed to DMR or federated metadata repository.

Entry box 612 may include information regarding the attribute values. The information may include the last instance when the attribute values, included in the DMR, did not match the attribute values included in the metadata repository. The information may assist the user in determining the current modifications. Entry box 612 may display a matching attribute that has been modified previously. Entry box 612 may include information regarding the case, values and information regarding the decision that was made. Historical information may enable the case user to understand the previous issues and make a well-informed decision.

Figure 7:
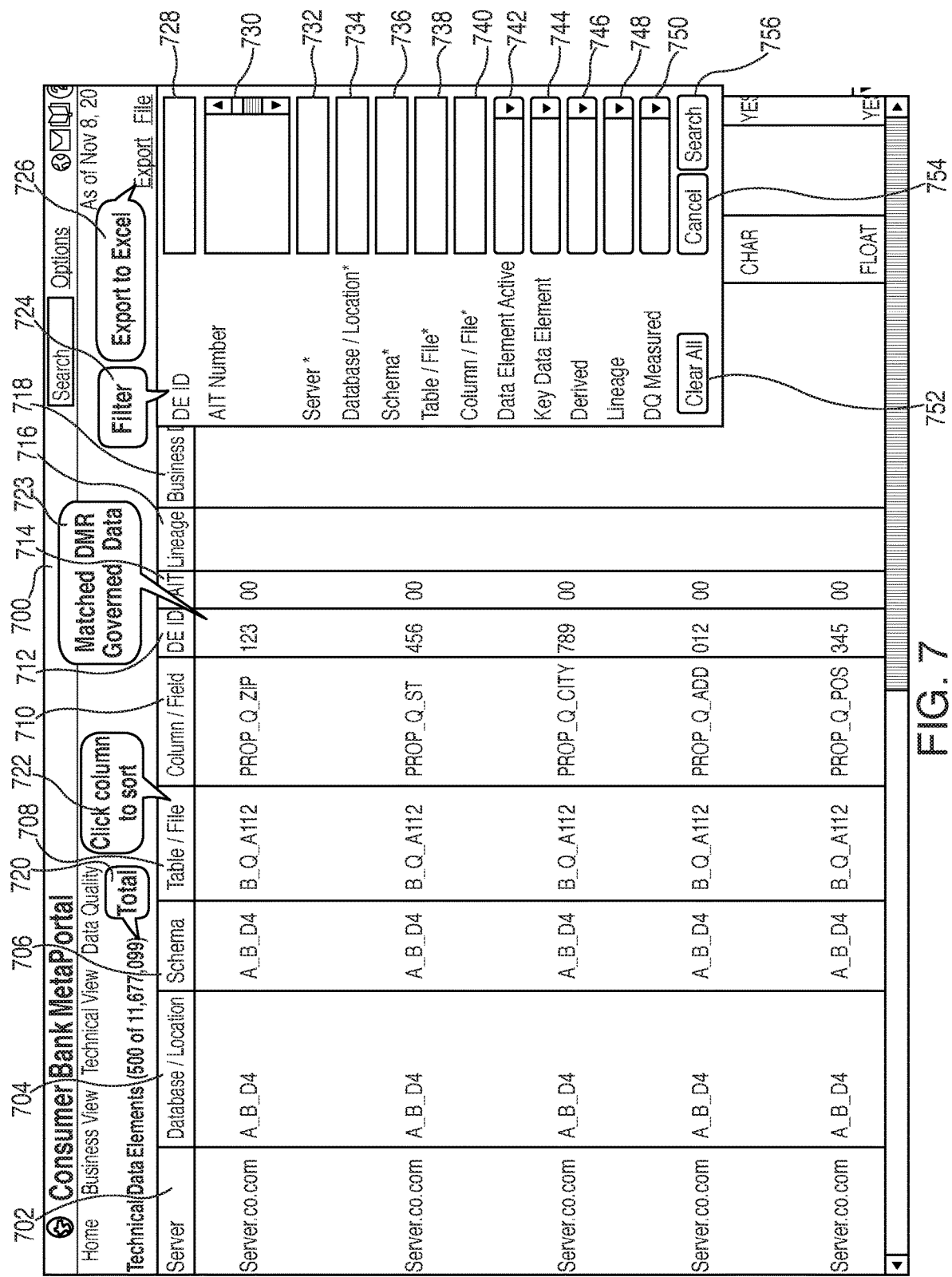
FIG. 7 shows an illustrative user interface of an embodiment of the invention.

FIG. 7 shows consumer bank metaportal UI 700. UI 700 may show technical data elements. Data elements may represent a grouping of attributes using 5-part keys (server—702, database/location—704, schema—706, table—706 and columns/fields). Additional, alternative groupings may also be utilized. For each data element, a user may view information relating to the element. For each data element, a user may also view the matching DMR-governed data identification number. A data element may include a grouping of attributes. The system may display information for many source—e.g., Becubic™, customer hub, card hub. The system may also display where each data element matched a DMR data element or where a data element did not match a DMR data element.

Each row may represent a unique instance of a data element based on the occurrence of the data element in the originating source, e.g., Becubic™, DMR, Customer Hub, Card Hub, etc. The row may include information relating to the data element. The information may be identified via the columns. The columns may include server—702, database/location—704, schema—706, table—708, column/field—710, data element ID—712, AIT—714, lineage—716, business description—718. Keys 702, 704, 706, 708 and 710 may be displayed and matched to DMR (712). Additional general information, such as AIT lineage, and additional attributes retrieved from metadata repository, such as business description, class word, and data type may be displayed as well.

A user may view the total amount of data elements, as shown at 720. A user may also click on a column to sort the data elements based on the selected column, as shown at 722. A user may view the retrieved match from DMR governed data, as shown at column 712. A user may be enabled to filter the data elements, as shown at 724.

A filtering box may be provided. The filtering box may enable a user filter based on data element id—728, AIT—number—730, server—732, database/location—734, schema—736, table/file—733, column/field—740, data element active—742, key data element—744, derived—746, lineage—748, data quality ("DQ") measured—750 as well as any other suitable filtering criterion. A user may filter with more than one filtering criterion. A user may select clear all button 752 to clear the current filtering criteria. A user may select cancel button 754 to cancel the filtered search. A user may select search button 756 to search using the current filtering criteria. Some selections may be prefilled based on data already known to the system.

A user may export the search to an Excel™ spreadsheet, or other suitable file, as shown at 726. This may enable a user to manipulate the spreadsheet using Microsoft Excel™ functionalities.

In some embodiments, the user interface may include a function that enables a user to select data elements unmatched to DMR data elements and move the data elements to DMR in order to become governed elements.

Figure 8A:
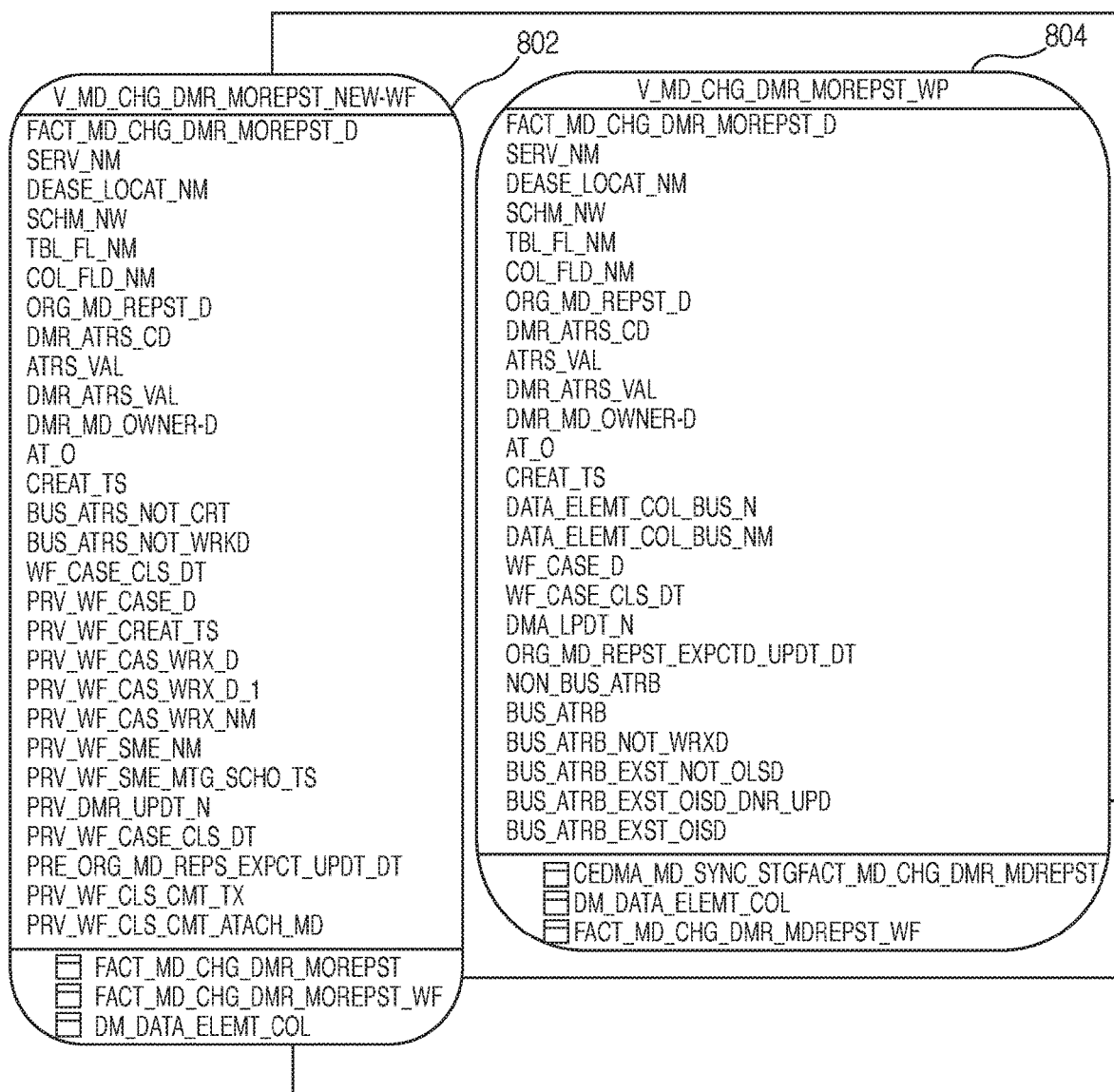
FIGS. 8A, 8B and 8C show an illustrative database model diagram of an embodiment of the invention.
Figure 8B:
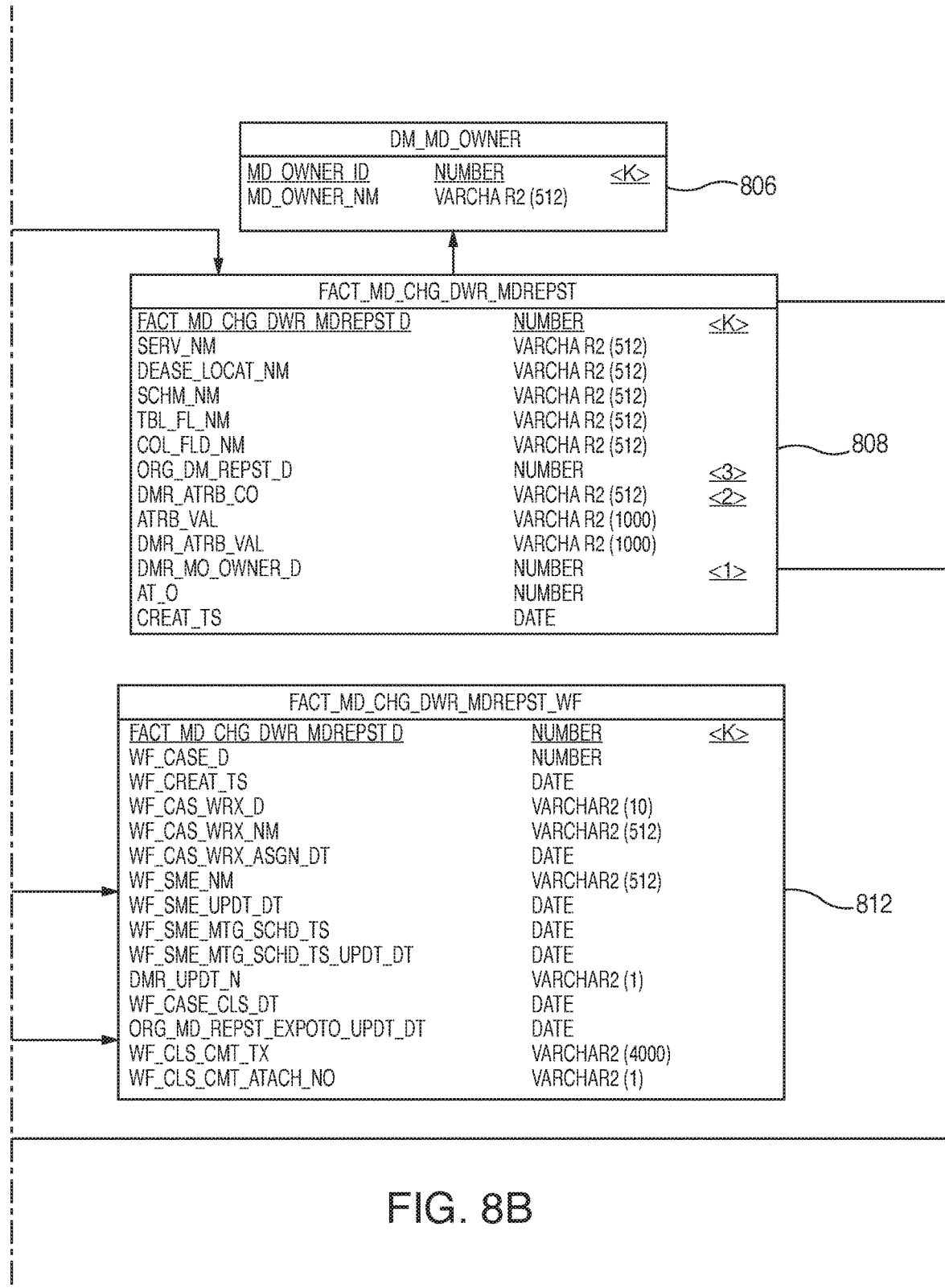
Figure 8C:
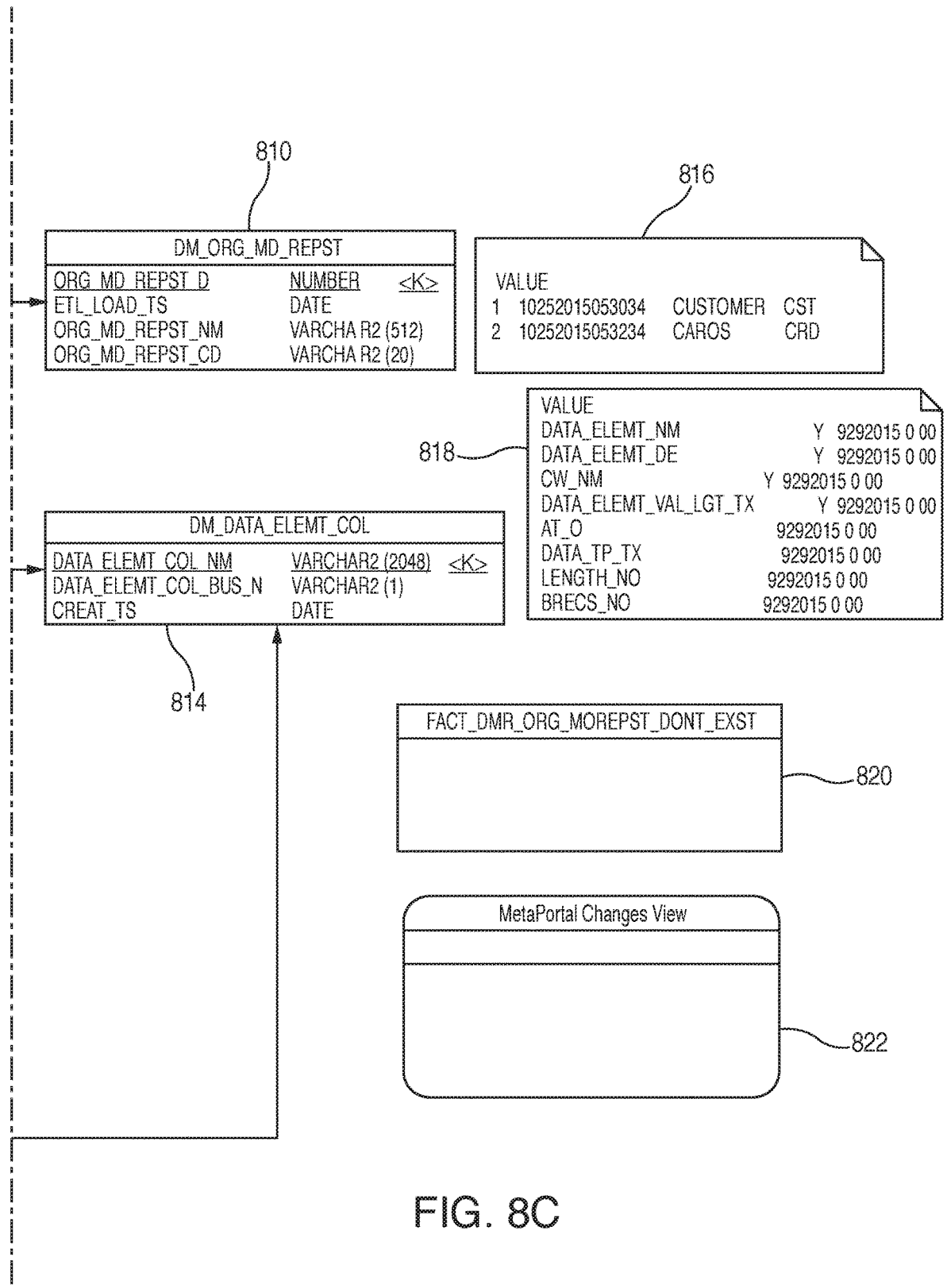

FIG. 8 shows a database model. The database model may represent attribute value changes between Rochade™, Appian™ and DMR staging. The database model may enable each user to receive a database section referring to him, while preferably, substantially simultaneously allowing the user to view, on the diagram, multiple changes in progress. Because the user may view all of the changes in progress on the database model, the database model may enable the removal of RESTful services. This may be because RESTful services may facilitate the transfer of change information from one user to another. The database diagram may remove the need to utilize a complex query to retrieve information. A user may view the database model, and the links between the tables, in order to retrieve information. The database diagram may also limit duplicate information because substantially all the information is available to the user. The user may view the information currently in the database model prior to adding information to the database model.

Table 802, may be included in Appian™. Table 802 may show work in progress changes. Table 804 may be included in Rochade™. Table 804 may include workflow metadata related to data element attribute changes. Table 806 may be a dimension table utilized for constraints. The constraint(s) may relate to a metadata owner group. For the purposes of this application, constraints may be understood to refer to rules that may be enforced on data columns on a database table. The rules may be used to limit the type of data that can be entered into a table. The rules may ensure accuracy and reliability of the data in the database. Constraints may be column level constraints or table level constraints. The metadata owner group may determine a group assignment for each workflow case.

Table 808 may be included in Rochade™. Table 808 may contain data element attribute changes. Table 810 may be a dimension table used for constraints. Table 810 may be an originating metadata repository. Data 816 may be exemplary data included in table 810. Table 812 may be included in Appian™. Table 812 may show work in progress changes. Table 814 may be a dimension table used for constraints. The constraint may relate to a data element column. Data 818 may be exemplary data included in table 814.

Table 820 may be included in Rochade™. Table 820 may include data elements which are not matched in a metadata repository. Table 822 may be utilized by DMR. Table 822 may include metaportal changes. The metaportal changes have been explained further in connection with FIG. 6, lead line 610.

FIG. 8 may show a model that allows for a common staging area. The staging model may eliminate passing information between process. The staging model may also resolve conflict resolution, as each systems writes to its own space on its own time and/or terms. Each system may also encapsulate common validation via constraints and business logic.

Figure 9A:
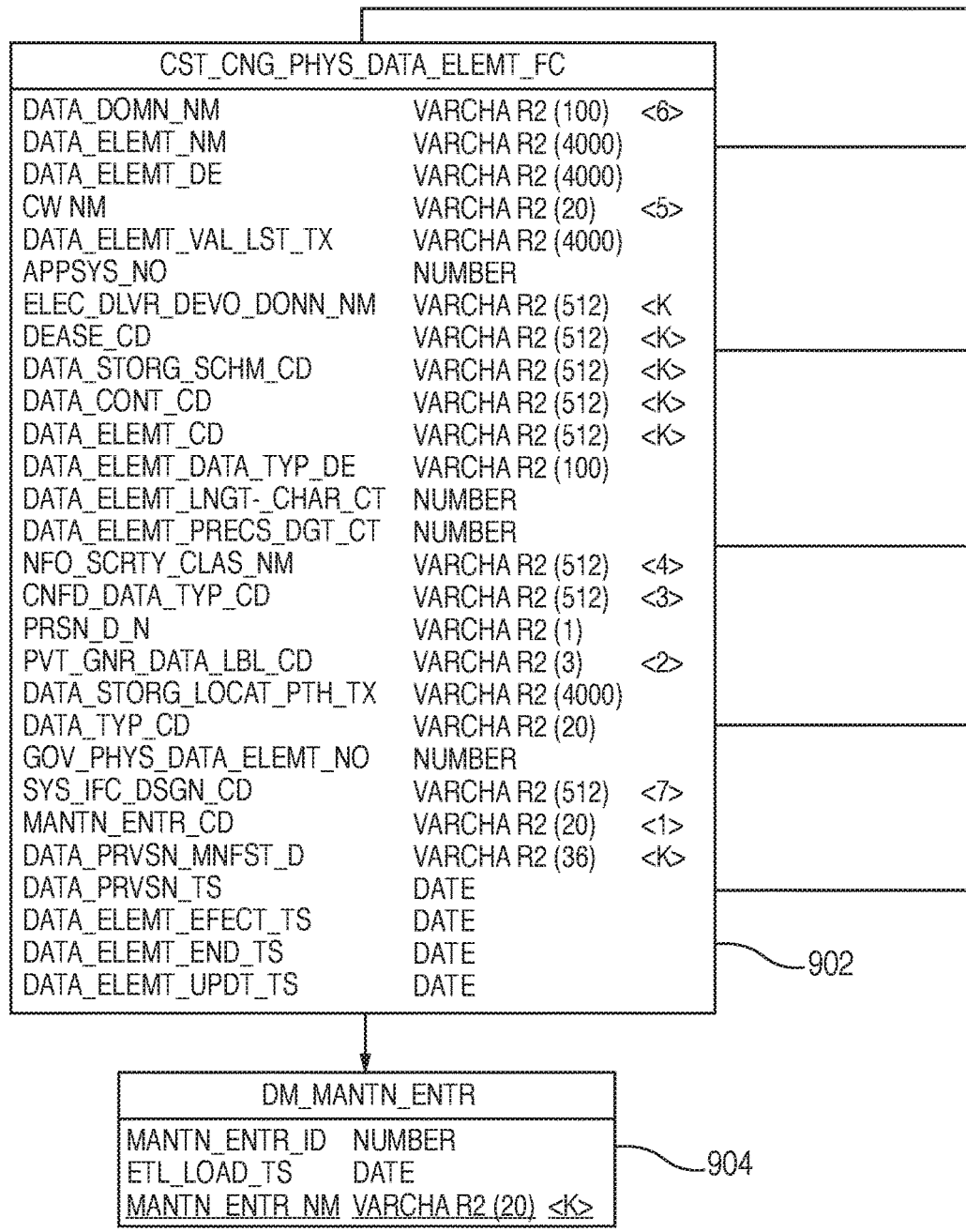
FIGS. 9A and 9B show an illustrative database model diagram of an embodiment of the invention.
Figure 9B:
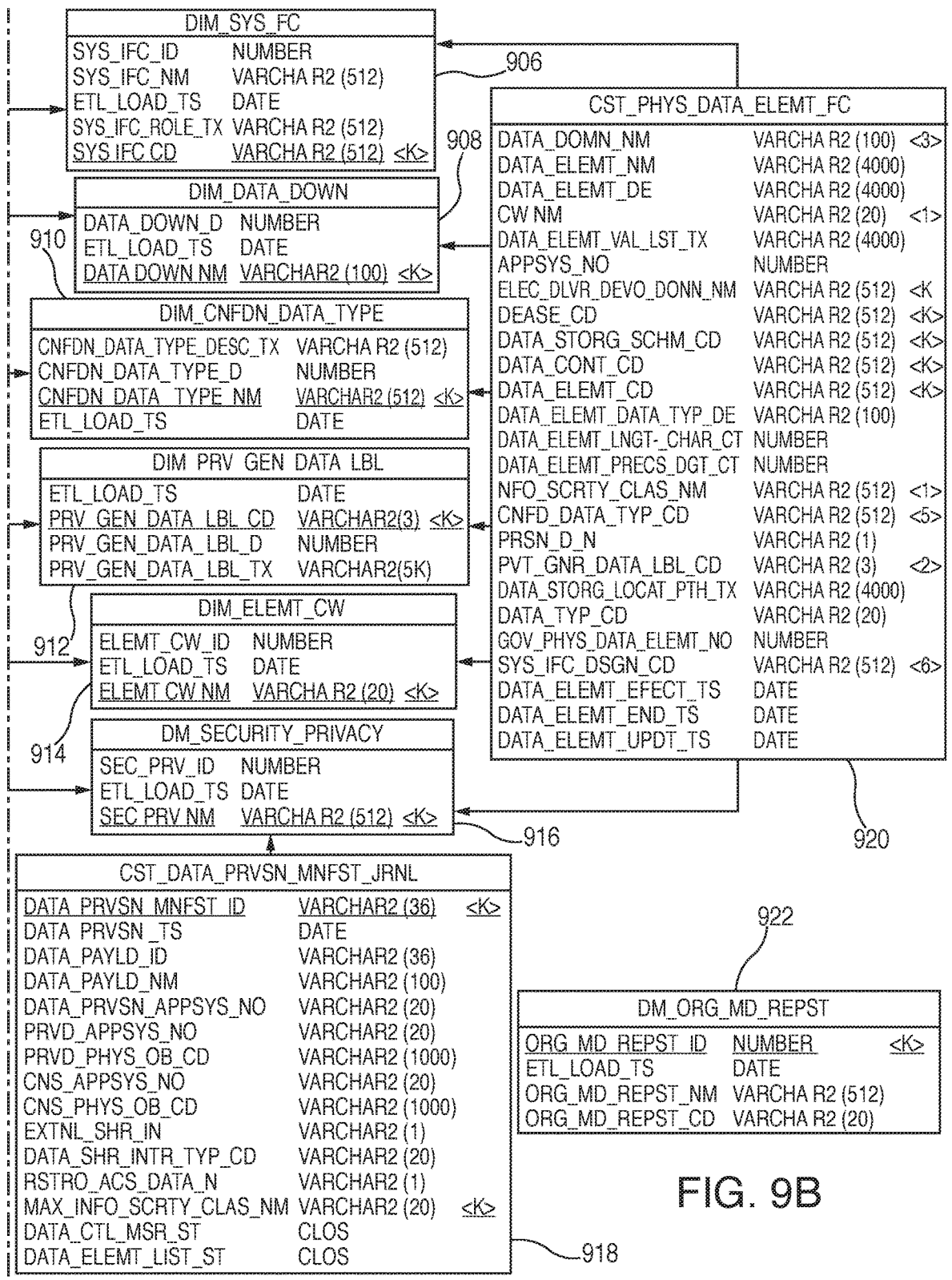

FIG. 9 shows a database model diagram relating to metadata repositories' landing zone and DMR staging tables. Table 902 may include added, deleted and updated changes. Table 902 may be a main delta table and a full load table. Table 902 may be updated once daily. Table 902 may be where hub and application information is stored.

Table 904 may be a dimension table used for constraints. Table 904 may be a maintenance entry table. The maintenance entry table may include an add indicator, a delete indicator and an update indicator.

Table 906 may be as dimension table used for constraints. The constraint may relate to feeds used by sub-entities.

Table 908 may be a dimension table used for constraints. The constraints may relate to a data domain.

Table 910 may be a dimension table used for constraints. The constraints may relate to confidential information such as, securities, financial instruments, corporate confidential information, non-public corporate information, non-public personal information and material non-public information.

Table 912 may be a dimension table used for constraints. The constraints may relate to private personal data, such as, age, gender, marital status, insurance information, social security number/tax identification number, risk rating as well as any other suitable data.

Table 914 may be a dimension table used for constraints. The constraints may relate to database field tags, such as name, number, object, percent, quality, etc.

Table 916 may be a dimension table used for constraints. The constraints may relate to database field tags for security and privacy, such as, confidential, proprietary and public. Dimension tables and or constraints may prevent invalid data to be inserted. Payload processes may be rejected based on the invalid data prevention. Therefore, payload processes may be returned to application owners for resolve. A dimension table may be a domain of values. The values may be used for a given attribute.

Table 918 may be a data controls table. The table may be referred to as a customer data provision manifest journal. The customer data provision manifest journal may control the information relating to a specific hub, for example, a customer hub.

Each data load may have a manifest describing the load. The manifest may be used to validate the load. While there may be many validation methods, a specific method may verify a total count in order to ensure that the number of inserts actually were inserted into the table.

Table 920 may be a main delta table. Table 920 may be a full load table. The table may contain all data—i.e., it may be a full reload. Table 920 may be updated monthly. Table 920 may be substantially similar to table 902, although it may not include the following columns: DATA_PRVSN_TS, DATA_PRVSN_MNFST_ID and MANTN_ENTR_CD.

Table 922 may be a domain mapping table. Table 922 may relate to an originating metadata repository.

Thus, methods and apparatus for a metadata synchronization system have been provided. Persons skilled in the art will appreciate that the present invention can be practiced by other than the described embodiments, which are presented for purposes of illustration rather than of limitation, and that, the present invention is limited only by the claims that follow.

What is claimed is:

1. A metadata synchronization system, the metadata synchronization system comprising:
   a federated metadata repository;
   a governed metadata repository;
   a crawler; and
   a processor;
   the metadata synchronization system operable to:
   receive, at the federated metadata repository, a plurality of metadata elements, said plurality of metadata elements being transmitted from a plurality of applications, said plurality of applications being coupled to a plurality of application hubs;
   receive, at the governed metadata repository, a subset of the plurality of metadata elements, said subset of the plurality of metadata elements being entity-critical metadata elements, said entity-critical metadata elements comprising at least governed assets and relationships, each entity-critical metadata element including a six-part attribute key, each of said six-part attribute keys not being included in the plurality of metadata elements included in the federated metadata repository, each of said six-part attribute keys comprising a server name variable character attribute, a database/location variable character attribute, a schema name variable character attribute, a table/file name variable character attribute, a column/field name variable character attribute and an originating metadata repository number attribute;

crawl, via the crawler, the plurality of applications, to determine that each metadata element included in the plurality of metadata elements has been received at the federated metadata repository;

transmit a first notification message to a first user in the event that a metadata element is not received at the federated metadata repository;

crawl, via the crawler, the federated metadata repository and the governed metadata repository to determine whether each metadata element that is included in both of the federated metadata repository and the governed metadata repository are identified using the same data type;

upon identification of a metadata element which is identified using one data type in the federated metadata repository and another data type in the governed metadata repository, conform, via the processor, the data type of identified metadata element included in the federated metadata repository and the data type of the identified metadata element included in the governed metadata repository;

crawl further, via the crawler, the plurality of applications to identify an extinct metadata element in an application that is coupled to the federated metadata repository;

in response to identifying of the extinct metadata element, remove the extinct metadata element from the federated metadata repository; and conform, via the processor, the governed metadata repository to the federated metadata repository by removing further the extinct metadata element from the governed metadata repository.

2. The system of claim 1, further operable to:
transmit a second notification message to a second user upon completion of the conforming;
crawl, via the crawler, the federated metadata repository and the governed metadata repository to determine which metadata elements, included in the plurality of metadata elements should be assigned a governed status;
notify the user which metadata elements were determined to be governed metadata elements.

3. The system of claim 2, wherein the first user is an application owner associated with the metadata element that has not been received at the federated metadata repository.

4. The system of claim 3, further operable to crawl, via the crawler, the plurality of applications, to ensure that a data type associated with each of the metadata elements, included in the plurality of metadata elements, is the same in the federated metadata repository, the governed metadata repository and the plurality of applications.

5. The system of claim 4, further operable to, upon determination by the crawler that at least one data element is not the same data type in the federated metadata repository, governed metadata repository and the plurality of applications, transmit a third notification message to a third user, the third notification message comprising the discrepancy.

6. The system of claim 5, wherein, upon determination by the crawler that at least one data element is not the same data type in the federated metadata repository, the governed metadata repository and the plurality of applications, transmit a third notification message to the first user and the second user, the third notification message comprising the discrepancy.

* * * * *